NO PRINTED SPECIFICATION AVAILABLE.
BEST AVAILABLE COPY
J. M. Smith.
Draft Roll for Spinning.
No. 188. A. I. Patented Jan. 26, 1858.
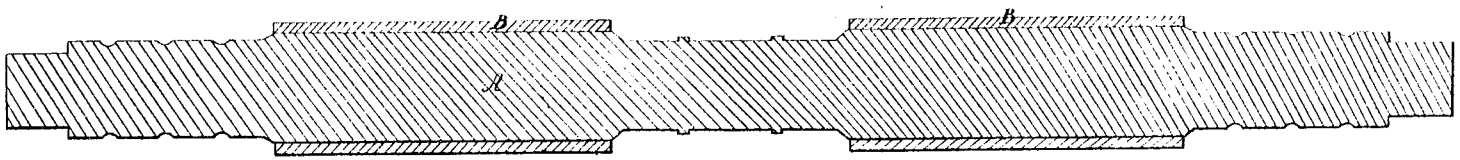
N. PETERS, PHOTO-LITHOGRAPHER, WASHINGTON, D. C.